(12) United States Patent
Gonthier et al.

(10) Patent No.: US 8,564,209 B2
(45) Date of Patent: Oct. 22, 2013

(54) CIRCUIT FOR CONTROLLING A LIGHTING UNIT WITH LIGHT-EMITTING DIODES

(75) Inventors: Laurent Gonthier, Tours (FR); Antoine Passal, Monnaie (FR)

(73) Assignee: STMicroelectronics (Tours) SAS, Tours (FR)

(*) Notice: Subject to any disclaimer, the term of this patent is extended or adjusted under 35 U.S.C. 154(b) by 378 days.

(21) Appl. No.: 12/797,924

(22) Filed: Jun. 10, 2010

(65) Prior Publication Data

US 2010/0315006 A1    Dec. 16, 2010

(30) Foreign Application Priority Data

Jun. 12, 2009 (FR) ...................................... 09 53922

(51) Int. Cl.
*H05B 39/00* (2006.01)

(52) U.S. Cl.
USPC ................. 315/185 S; 315/209 SC; 315/312; 315/291; 315/224

(58) Field of Classification Search
USPC .............. 315/209, 185 S, 247, 291, 224, 312, 315/209 SC
See application file for complete search history.

(56) References Cited

U.S. PATENT DOCUMENTS

| 3,716,758 | A * | 2/1973 | Palazzetti | 361/256 |
| 5,442,258 | A * | 8/1995 | Shibata | 315/129 |
| 2007/0096746 | A1* | 5/2007 | Telefont | 324/500 |
| 2009/0189529 | A1* | 7/2009 | Negley et al. | 315/122 |
| 2010/0066265 | A1* | 3/2010 | Itoh | 315/291 |

FOREIGN PATENT DOCUMENTS

| GB | 2 399 236 A | 8/2004 |
| GB | 2 435 724 A | 5/2007 |

OTHER PUBLICATIONS

French Search Report dated Mar. 2, 2010 from corresponding French Application No. 09/53922.
Rand D et al., *Issues, Models and Solutions for Triac Modulated Phase Dimming of LED Lamps*; Power Electronics Specialists Conference, 2007. PESC 2007; IEEE, IEEE, Piscataway, NJ, Jun. 17, 2007, pp. 1398-1404, XP0312184889.

* cited by examiner

*Primary Examiner* — Tuyet Thi Vo
(74) *Attorney, Agent, or Firm* — Wolf, Greenfield & Sacks, P.C.

(57) ABSTRACT

A circuit capable of receiving, in series with at least one light-emitting diode, a rectified A.C. voltage, comprising: a first gate turn-off thyristor connected to first and second terminals of the circuit; and a control circuit for turning off the first thyristor when the voltage between the first and second terminals exceeds a threshold.

12 Claims, 2 Drawing Sheets

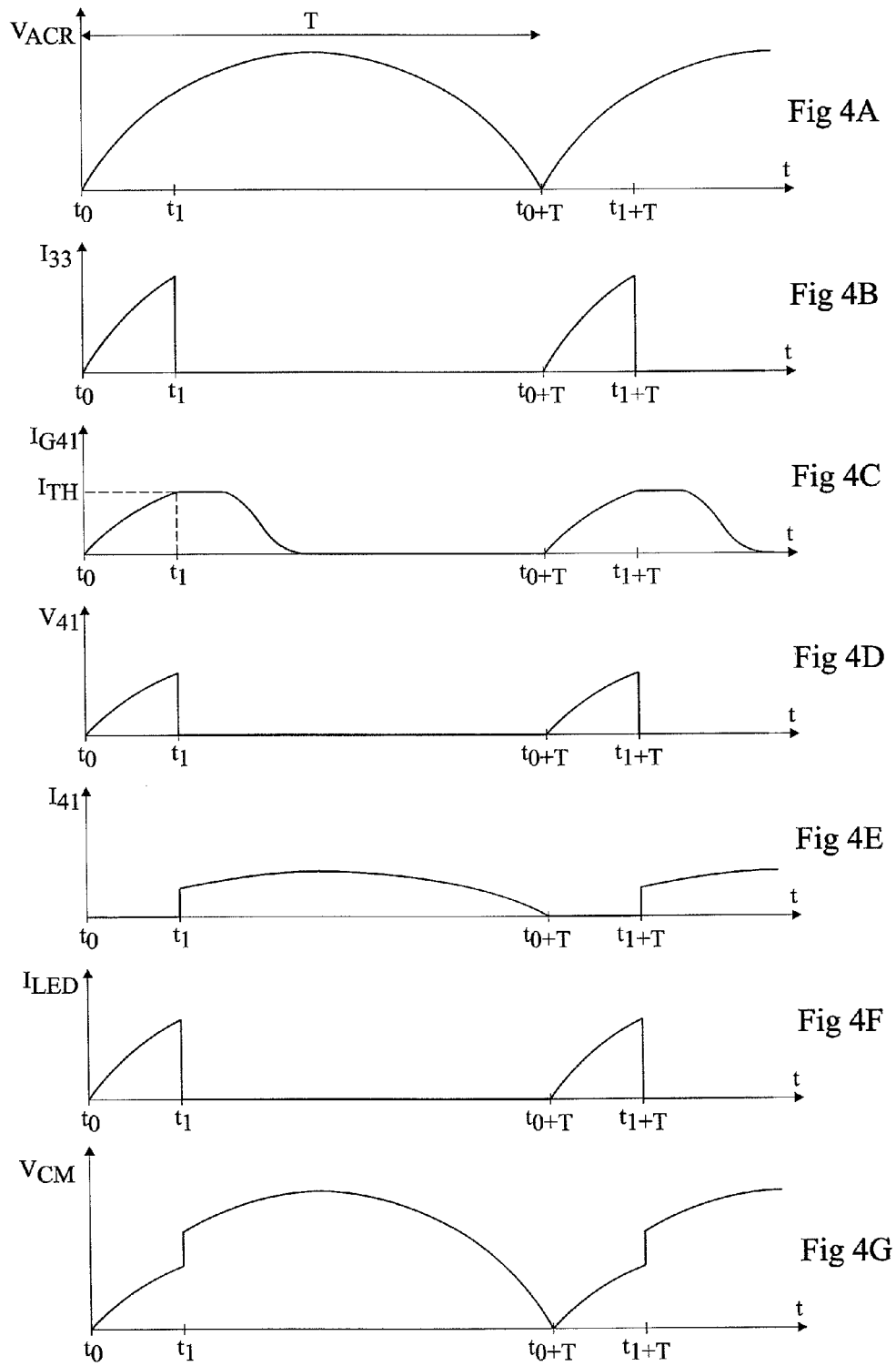

US 8,564,209 B2

CIRCUIT FOR CONTROLLING A LIGHTING UNIT WITH LIGHT-EMITTING DIODES

CROSS REFERENCE TO RELATED APPLICATIONS

This application claims the priority benefit of French patent application number 09/53922, filed on Jun. 12, 2009, entitled "CIRCUIT FOR CONTROLLING A LIGHTING UNIT WITH LIGHT-EMITTING DIODES," which is hereby incorporated by reference to the maximum extent allowable by law.

BACKGROUND OF THE INVENTION

1. Field of the Invention

The present invention relates to lighting units with light-emitting diodes intended to receive an A.C. supply voltage. It more specifically relates to circuits for powering such devices.

2. Discussion of the Related Art

For a long time, illumination devices have been formed based on incandescent light bulbs or on fluorescent tubes capable of receiving an A.C. supply voltage, for example, a 220-V mains voltage at 50 Hz. More recently, it has been desired to use light-emitting diodes. Such diodes especially have a long lifetime and a high light output. They however require a power supply circuit capable of receiving the A.C. voltage from the mains.

Conventional circuits operate in linear mode, that is, they provide a D.C. voltage and a power adapted to the electrical characteristics of the diodes. The diodes are then maintained on for the entire duration of each halfwave of the mains voltage. This power supply mode has the disadvantage of decreasing their lifetime. Further, linear power supply circuits generally comprise high-voltage capacitors having the disadvantage of being expensive and bulky.

SUMMARY OF THE INVENTION

An object of an embodiment of the present invention is to overcome all or part of the disadvantages of circuits for powering light-emitting diodes.

An object of an embodiment of the present invention is to provide such a circuit improving the lifetime of the diodes.

An object of an embodiment of the present invention is to provide such a circuit which has low cost and is easy to form.

Thus, an embodiment of the present invention provides a circuit capable of receiving, in series with at least one light-emitting diode, a rectified A.C. voltage, comprising: a first gate turn-off thyristor connected to first and second terminals of the circuit; and a control circuit for turning off the first thyristor when the voltage between the first and second terminals exceeds a threshold.

According to an embodiment of the present invention, said circuit capable of receiving, in series with at least one light-emitting diode, a rectified A.C. voltage, comprises a second thyristor connecting the gate of the first thyristor to said second terminal; and a first resistive element connecting the gate of the first thyristor to said first terminal or to a terminal of application of the rectified A.C. voltage.

According to an embodiment of the present invention, said circuit capable of receiving, in series with at least on light-emitting diode, a rectified A.C. voltage, comprises, in series with the first thyristor, a voltage dividing bridge for setting said threshold, the midpoint of the voltage dividing bridge being connected to a gate of the second thyristor.

According to an embodiment of the present invention, said circuit capable of receiving, in series with at least one light-emitting diode, a rectified A.C. voltage, further comprises a circuit of temporary power storage between the midpoint of the voltage dividing bridge and said gate of the second thyristor.

According to an embodiment of the present invention, said storage circuit comprises: a second resistive element in series with a capacitive storage element, connecting said gate of the second thyristor to said second terminal; and a diode connecting the midpoint of the voltage dividing bridge to said gate of the second thyristor.

According to an embodiment of the present invention, the resistivity of said voltage dividing bridge is low as compared to the resistivity of the first resistive element.

According to an embodiment of the present invention, a capacitive electromagnetic disturbance attenuation element is connected between said first and second terminals.

According to an embodiment of the present invention, the first thyristor is maintained on at the beginning of each halfwave of said rectified A.C. voltage, for a period ranging between 5% and 30% of the duration of said halfwave.

An embodiment of the present invention further provides an illumination device intended to receive an A.C. voltage comprising: a bridge for rectifying the A.C. voltage; at least one light-emitting diode; and a circuit capable of receiving, in series with at least one light-emitting diode, a rectified A.C. voltage, according to any of the above-mentioned embodiments, series-connected with said at least one light-emitting diode, between output terminals of said rectifying bridge.

According to an embodiment of the present invention, said circuit capable of receiving, in series with at least one light-emitting diode, a rectified A.C. voltage, forms a dipole.

The foregoing objects, features, and advantages of the present invention will be discussed in detail in the following non-limiting description of specific embodiments in connection with the accompanying drawings.

BRIEF DESCRIPTION OF THE DRAWINGS

FIGS. 4A to 4G are simplified timing diagrams illustrating the operation of the illumination device of FIG. 3.

DETAILED DESCRIPTION

Figure 1:
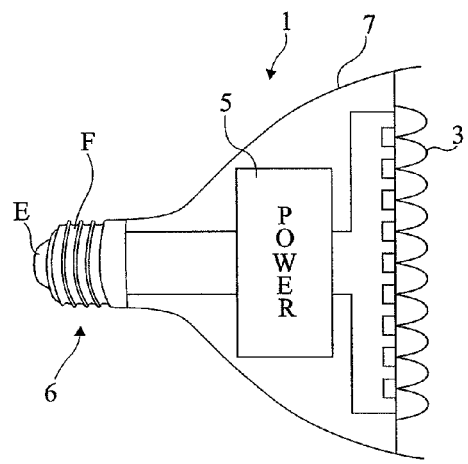
FIG. 1 schematically shows an illumination device with light-emitting diodes.

For clarity, the same elements have been designated with the same reference numerals in the different drawings. Further, the timing diagrams of FIGS. 4A to 4G are not to scale.

FIG. 1 is a simplified view of an illumination device 1 with light-emitting diodes 3.

Figure 2:
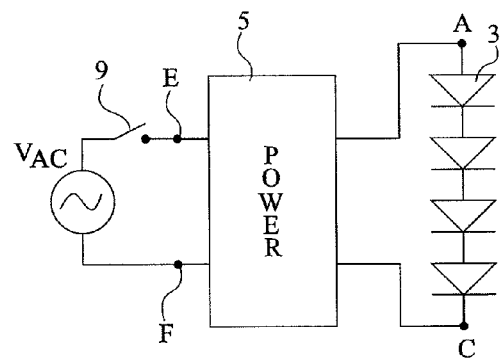
FIG. 2 shows the simplified electric diagram of the illumination device of FIG. 1.

FIG. 2 is a simplified electric diagram of device 1.

Device 1 comprises an assembly of light-emitting diodes 3 in series. Terminals A and C (FIG. 2) of diode assembly 3 are connected to a power supply circuit 5 (POWER). In the shown example, terminals A and C respectively correspond to the anode and cathode connection terminals of the assembly of diodes 3 in series.

Circuit 5 is capable of receiving an A.C. voltage $V_{AC}$ (FIG. 2), for example, the mains voltage, and of providing a power adapted to the electrical characteristics of the assembly of diodes 3. Input terminals of power supply circuit 5 are connected to terminals E and F of a base 6. Base 6 may have any shape adapted to a connection on a socket, for example, a screw thread. Other connections may be provided, for example, a direct wiring to a power supply connector. The entire device is assembled in a package 7 only leaving access to base 6 and diodes 3. Transparent glass, not shown, may protect diodes 3.

A switch 9 is generally provided, for example, between a terminal of application of the phase of mains voltage $V_{AC}$ and terminal E of base 6, to control the powering-on of device 1. Switch 9 may correspond to a wall switch that may be actuated by a user.

To improve the lifetime and the efficiency of the diodes, it is provided to maintain them on for a fraction only of each period of the mains voltage, which is sufficient, in relation with the eye's persistence of vision, to guarantee a continuous illumination.

Thus, an aspect of an embodiment of the present invention is to provide a power supply circuit capable of providing a pulse control signal, the electric power received by the diodes depending on the duration of the pulse.

Figure 3:
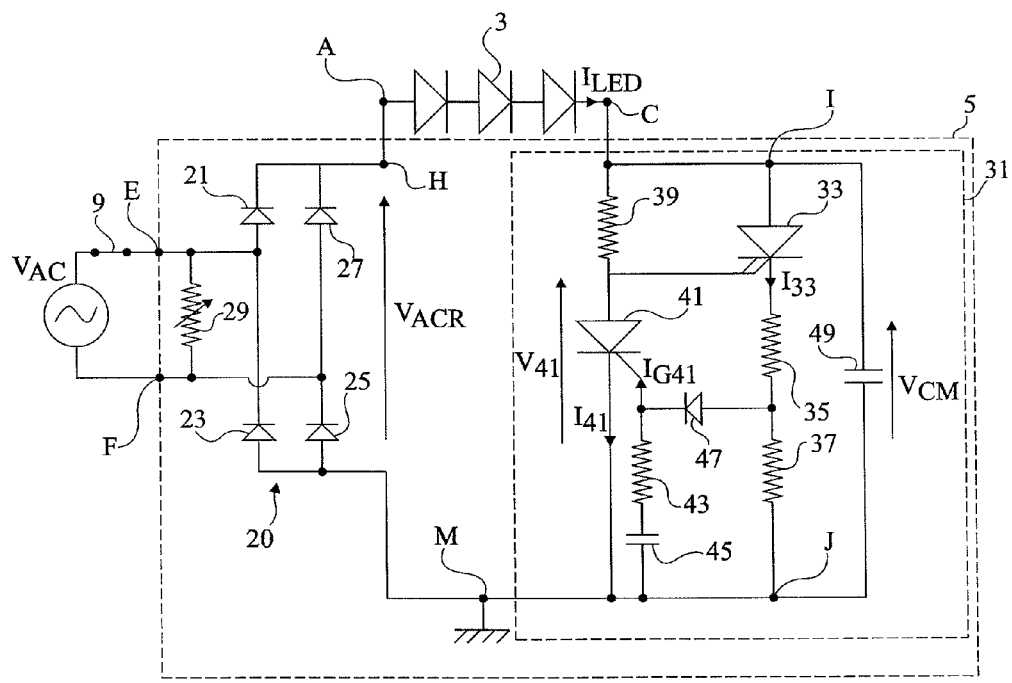
FIG. 3 shows the simplified electric diagram of the illumination device of FIG. 1.

FIG. 3 is the electric diagram of an embodiment of the illumination device of FIG. 2 showing power supply circuit 5 in more detailed fashion.

Terminals E and F of the base are connected to A.C. input terminals of a fullwave rectifying bridge 20 capable of providing, between high and low output terminals H and M, a rectified A.C. voltage $V_{ACR}$. Terminal M for example corresponds to the reference voltage terminal of the circuit or ground. In the shown example, bridge 20 comprises four diodes 21, 23, 25, and 27.

In this example, power supply circuit 5 further comprises a dipole or control circuit 31 connected, in series with diode assembly 3, between output terminals H and M of rectifying bridge 20. Terminal A of diode assembly 3 is connected to terminal H. Terminals I and J of dipole 31 are respectively connected to terminal C of diode assembly 3 and to terminal M.

Circuit 31 comprises a gate turn-off thyristor 33 having its anode connected to terminal I. A voltage dividing bridge formed, for example, of two resistors 35 and 37 in series, is connected between the cathode of thyristor 33 and terminal J. A resistor 39, of strong value with respect to resistors 35 and 37, is connected between the anode and the gate of thyristor 33. Resistor 39 is used to turn on thyristor 33 at the beginning of each halfwave of voltage $V_{ACR}$. A cathode gate thyristor 41 is forward connected between the gate of thyristor 33 and terminal J for controlling the turning off of thyristor 33. The voltage dividing bridge conditions the turning on of thyristor 41.

For the case where thyristor 41 would not be fast enough, a temporary power storage circuit is preferably provided. This circuit, for example, comprises a resistor 43, series connected with a capacitor 45, between the gate of thyristor 41 and terminal J, and a diode 47, forward connected between the midpoint of the voltage dividing bridge and the gate of thyristor 41.

Optionally, a capacitor 49 connects terminal I to terminal J, to attenuate electromagnetic disturbances linked to the switching of thyristors 33 and 41.

Power supply circuit 5 may further comprise, between its input terminals E and F, a varistor 29 of protection against possible overvoltages.

As a specific embodiment:
resistances 37 and 43 are on the order of a few tens of Ω, for example, on the order of 10Ω;

resistance 35 is on the order of a few hundreds of Ω, for example, on the order of 250Ω;

resistance 39 is on the order of a few tens of kΩ, for example, on the order of 75Ω;

capacitance 45 is on the order of a few hundreds of nF, for example, on the order of 100 nF; and capacitance 49 is on the order of a few tens of nF, for example, on the order of 10 nF.

FIGS. 4A to 4G are simplified timing diagrams showing examples of the variation of the voltages and currents at different points of the illumination device of FIG. 3. FIG. 4A shows the variation of rectified A.C. voltage $V_{ACR}$. FIG. 4B shows the variation of current $I_{33}$ flowing through thyristor 33. FIG. 4C shows the variation of current $I_{G41}$ flowing between the cathode gate and the cathode of thyristor 41. FIG. 4D shows the variation of voltage $V_{41}$ across thyristor 41. FIG. 4E shows the variation of current $I_{41}$ flowing through thyristor 41. FIG. 4F shows the variation of current $I_{LED}$ flowing through diode assembly 3. FIG. 4G shows the variation of voltage $V_{CM}$ between terminals C and M.

A steady state is assumed, that is, switch 9 is assumed to be on.

At a time t0 of beginning of a halfwave of voltage $V_{ACR}$, thyristor 41 is off. A current flows through diodes 3, resistor 39, the gate of thyristor 33, and resistors 35 and 37. Thyristor 33 thus starts conducting. A conduction path is thus established between terminal A and the ground, running through diode assembly 3, thyristor 33, and resistors 35 and 37 of low value of the voltage dividing bridge. The diodes turn on. Current $I_{LED}$ is then equal to current $I_{33}$.

From time t0, gate current $I_{G41}$ of thyristor 41 increases proportionally to current $I_{33}$, to within a factor especially depending on the value of resistors 35 and 37 of the voltage dividing bridge. A current for charging capacitor 45 further flows between the cathode of diode 47 and terminal M. Voltage $V_{41}$ across thyristor 41 is equal to rectified voltage $V_{ACR}$ minus the voltage drop caused by diode assembly 3 and by resistor 39. Voltage $V_{CM}$ is equal to rectified voltage $V_{ACR}$ minus the voltage drop of diode assembly 3.

At a time t1, current $I_{G41}$ reaches a turn-on threshold $I_{TH}$ of thyristor 41. The turning on of thyristor 41 brings the gate of thyristor 33 to ground ($V_{41}$=0 V), thus turning it off. Current $I_{33}$ flowing through thyristor 33 thus becomes zero. There then is a conduction path between terminal A of diode assembly 3 and terminal M, running through diode assembly 3, resistor 39, and thyristor 41. At time t1, current $I_{LED}$ becomes equal to current $I_{41}$. The value of resistor 39 is selected to be sufficiently high for this current to be very low (it is shown as being zero in FIG. 4F). Thus, diodes 3 turn off substantially at time t1. The values of resistors 35 and 37 of the voltage dividing bridge define the threshold of voltage $V_{ACR}$ for which current $I_{G41}$ reaches turn-on threshold $I_{TH}$ of thyristor 41. The values of resistors 35 and 37 are for example selected so that the time for which diodes 3 are on ranges between 5% and 30% of duration T of a halfwave of rectified voltage $V_{ACR}$. Further, at time t1, voltage $V_{CM}$ is abruptly taken up to the value of voltage $V_{ACR}$ (neglecting the voltage drop in diodes 3 with respect to the voltage drop in resistor 39).

To ensure the priming of thyristor 41, capacitor 45 maintains a non-zero current $I_{G41}$ for some time after time t1.

Thyristor 41 remains conductive until the current that it conducts cancels, that is, until end time t0+T of the halfwave. Thus, diodes 3 are maintained off between times t1 and t0+T.

In a transient state of turning on of switch 9, this turning on may occur at any time of the halfwave. Thyristor 33 turns on at this time but current $I_{G41}$ immediately reaches turn-on threshold $I_{TH}$ of thyristor 41, thus turning off of thyristor 33 and turning off diodes 3 until the beginning of the next halfwave. This enables the diodes to see across their terminals a voltage close to the maximum mains voltage for a very short time, thus avoiding their destruction. The diodes are thus protected.

The use of a fullwave rectifying bridge provides a frequency of the diode control pulses equal to twice the frequency of the A.C. power supply voltage. Such a frequency is sufficient to get rid of possible flickering effects with a mains voltage of 50 Hz or 60 Hz.

An advantage of the provided circuit is that it has a low cost, a small bulk, and is easy to form.

To form a power supply circuit capable of providing a pulse control signal, it could have been devised to use, instead of gate turn-off thyristor 33, a gate turn-on thyristor. This thyristor would then have to be turned on at a time close to the end of each halfwave of the rectified voltage, the diodes remaining substantially conductive until the end of each halfwave. However, spurious voltage peaks may appear, in particular at the turning on of switch 9. Such peaks would be capable of causing the turning-on of the diode turn on thyristor. In this case, the diodes would remain on substantially until the end of the halfwave. If switch 9 had been turned on, for example, at the beginning of a halfwave, the diodes would receive a much greater power than that for which they have been provided, which would cause their destruction.

Specific embodiments of the present invention have been described. Various alterations and modifications will occur to those skilled in the art. In particular, the present invention applies whatever the available A.C. supply voltage. Further, the number of light-emitting diodes and their connection may vary.

Further, the illumination device may comprise a dimming function if one of the resistors of the voltage dividing bridge is replaced with a variable resistor.

Moreover, in the circuit described in relation with FIG. 3, terminals A and C of the assembly of light-emitting diodes are respectively connected to terminal H, corresponding to the high terminal of the rectified supply voltage, and to anode terminal I of gate turn-off thyristor 33. According to an alternative embodiment, resistor 37 is connected to terminal M, no longer directly but via diode assembly 3. According to another variation, resistor 39 is no longer connected to terminal C but to terminal H. Such variations may be combined.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An apparatus comprising:
   a circuit in series with at least one light-emitting diode to receive, at a first terminal of the circuit, a rectified A.C. voltage, the circuit comprising:
   a first gate turn-off thyristor connected between the first terminal and a second terminal of the circuit to, when in a conductive state, conduct the rectified A.C. voltage; and
   a control circuit for turning to turn off the first thyristor in response to the rectified A.C. voltage between the first and second terminals exceeding a threshold.

2. The apparatus of claim 1, wherein the circuit comprises a capacitive electromagnetic disturbance attenuation element connected between said first and second terminals.

3. The apparatus of claim 1, wherein the first thyristor is maintained on at the beginning of each halfwave of said rectified A.C. voltage, for a period ranging between 5% and 30% of the duration of said halfwave.

4. The apparatus of claim 1, wherein the circuit is arranged such that the first gate turn-off thyristor is conductive when the rectified A.C. voltage is below the threshold.

5. The apparatus of claim 1, wherein the circuit is arranged to receive the rectified A.C. voltage from the at least one light-emitting diode.

6. A circuit capable of receiving, in series with at least one light-emitting diode, a rectified A.C. voltage, the circuit comprising:
   a first gate turn-off thyristor connected to first and second terminals of the circuit;
   a control circuit for turning off the first thyristor when the voltage between the first and second terminals exceeds a threshold;
   a second thyristor connecting the gate of the first thyristor to said second terminal; and
   a first resistive element connecting the gate of the first thyristor to said first terminal or to a terminal of application of the rectified A.C. voltage.

7. The circuit of claim 6, comprising, in series with the first thyristor, a voltage dividing bridge for setting said threshold, the midpoint of the voltage dividing bridge being connected to a gate of the second thyristor.

8. The circuit of claim 7, further comprising a circuit of temporary power storage between the midpoint of the voltage dividing bridge and said gate of the second thyristor.

9. The circuit of claim 8, wherein said storage circuit comprises:
   a second resistive element in series with a capacitive storage element, connecting said gate of the second thyristor to said second terminal; and
   a diode connecting the midpoint of the voltage dividing bridge to said gate of the second thyristor.

10. The circuit of claim 7, wherein the resistivity of said voltage dividing bridge is low as compared to the resistivity of the first resistive element.

11. An illumination device to receive an A.C. voltage comprising:
    a bridge for rectifying the A.C. voltage;
    the at least one light-emitting diode; and
    the circuit of claim 1 connected between output terminals of said rectifying bridge.

12. The illumination device of claim 11, wherein said circuit forms a dipole.

* * * * *

UNITED STATES PATENT AND TRADEMARK OFFICE
CERTIFICATE OF CORRECTION

PATENT NO.         : 8,564,209 B2
APPLICATION NO.    : 12/797924
DATED              : October 22, 2013
INVENTOR(S)        : Laurent Gonthier et al.

Page 1 of 1

It is certified that error appears in the above-identified patent and that said Letters Patent is hereby corrected as shown below:

In the Claims:
        Col. 6, line 5, should read:
        a control circuit to turn off the first thyristor Signed and Sealed this
Tenth Day of December, 2013

Margaret A. Focarino
*Commissioner for Patents of the United States Patent and Trademark Office*